(12) United States Patent
Henry

(10) Patent No.: US 8,229,802 B2
(45) Date of Patent: Jul. 24, 2012

(54) STOCK MONITORING

(75) Inventor: Dean Henry, Birmingham (GB)

(73) Assignee: Inventor-e Limited, Birmingham (GB)

( * ) Notice: Subject to any disclaimer, the term of this patent is extended or adjusted under 35 U.S.C. 154(b) by 411 days.

(21) Appl. No.: 12/300,121

(22) PCT Filed: May 8, 2007

(86) PCT No.: PCT/EP2007/004065
§ 371 (c)(1),
(2), (4) Date: Nov. 7, 2008

(87) PCT Pub. No.: WO2007/128572
PCT Pub. Date: Nov. 15, 2007

(65) Prior Publication Data
US 2009/0222359 A1    Sep. 3, 2009

(30) Foreign Application Priority Data
May 8, 2006  (GB) .................................. 0609101.1

(51) Int. Cl.
*G06Q 10/00* (2006.01)
(52) U.S. Cl. ........................................................ 705/28
(58) Field of Classification Search ..................... 705/28
See application file for complete search history.

(56) References Cited

U.S. PATENT DOCUMENTS

| | | | | |
|---|---|---|---|---|
| 4,108,363 A | 8/1978 | Susumu | ........................ | 235/383 |
| 5,724,837 A | 3/1998 | Shin | | |
| 7,295,110 B2 | 11/2007 | Mercier et al. | | |
| 8,047,988 B2 | 11/2011 | Lee et al. | | |
| 2006/0152339 A1 | 7/2006 | Mercier et al. | | |
| 2006/0164247 A1 | 7/2006 | Overhultz et al. | | |
| 2007/0035380 A1 | 2/2007 | Overhultz et al. | | |
| 2008/0103939 A1* | 5/2008 | Gibb | ............................... | 705/28 |
| 2008/0195944 A1 | 8/2008 | Lee et al. | | |
| 2009/0119232 A1 | 5/2009 | Mercier et al. | | |

FOREIGN PATENT DOCUMENTS

| | | |
|---|---|---|
| FR | 2317712 A1 | 4/1977 |
| FR | 2 865 061 A1 | 7/2005 |
| WO | 2006/034885 A1 | 4/2006 |

OTHER PUBLICATIONS

"Materials conveying, loading and storage," Plastics Technology, v44 , n8 , p. 281, Aug. 1998.*
Non-Final Office Action, dated May 24, 2012; Issued on corresponding U.S. Appl. No. 12/838,870.

* cited by examiner

*Primary Examiner* — Matthew S Gart
*Assistant Examiner* — Seye Iwarere
(74) *Attorney, Agent, or Firm* — Squire Sanders (US) LLP

(57) ABSTRACT

System(s) and method(s) for stock monitoring are provided. Stock monitoring system(s) may include, e.g., a housing, one or more doors disposed in or on the housing, a sensor for sensing the condition of the door(s) and providing a door closed signal indicative of the door(s) having been closed by a user; one or more containers for stock items, located within the housing, the or each container having associated therewith a weight sensor for providing a weight signal indicative of the current weight of the container, and control circuitry, coupled for communication with the weight sensor(s). Method(s) may include, e.g., receiving a door closed signal; receiving one or more weight signals; and determining, for the or each container, the number of stock items removed from the container(s) by the user, from the weight signal(s) occurring during a predetermined sensing period, the predetermined sensing period being dependent upon the door closed signal.

20 Claims, 12 Drawing Sheets

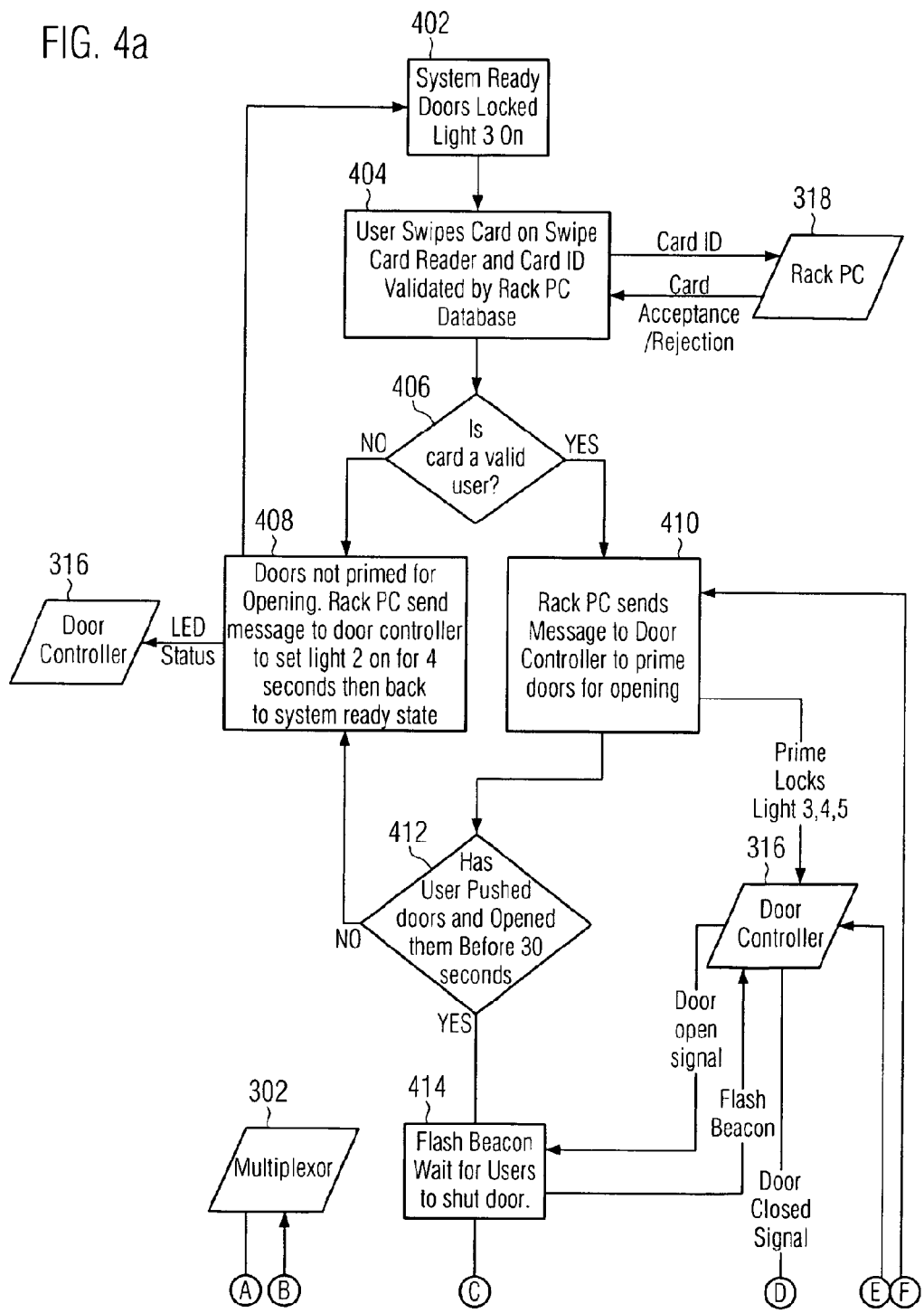

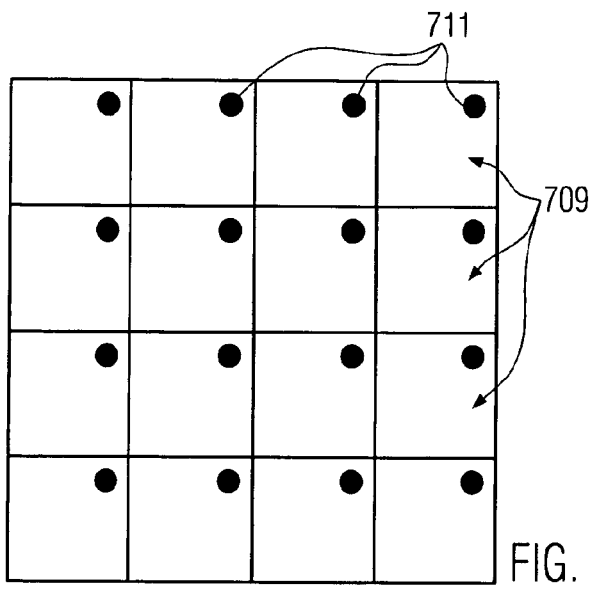
FIG. 7b
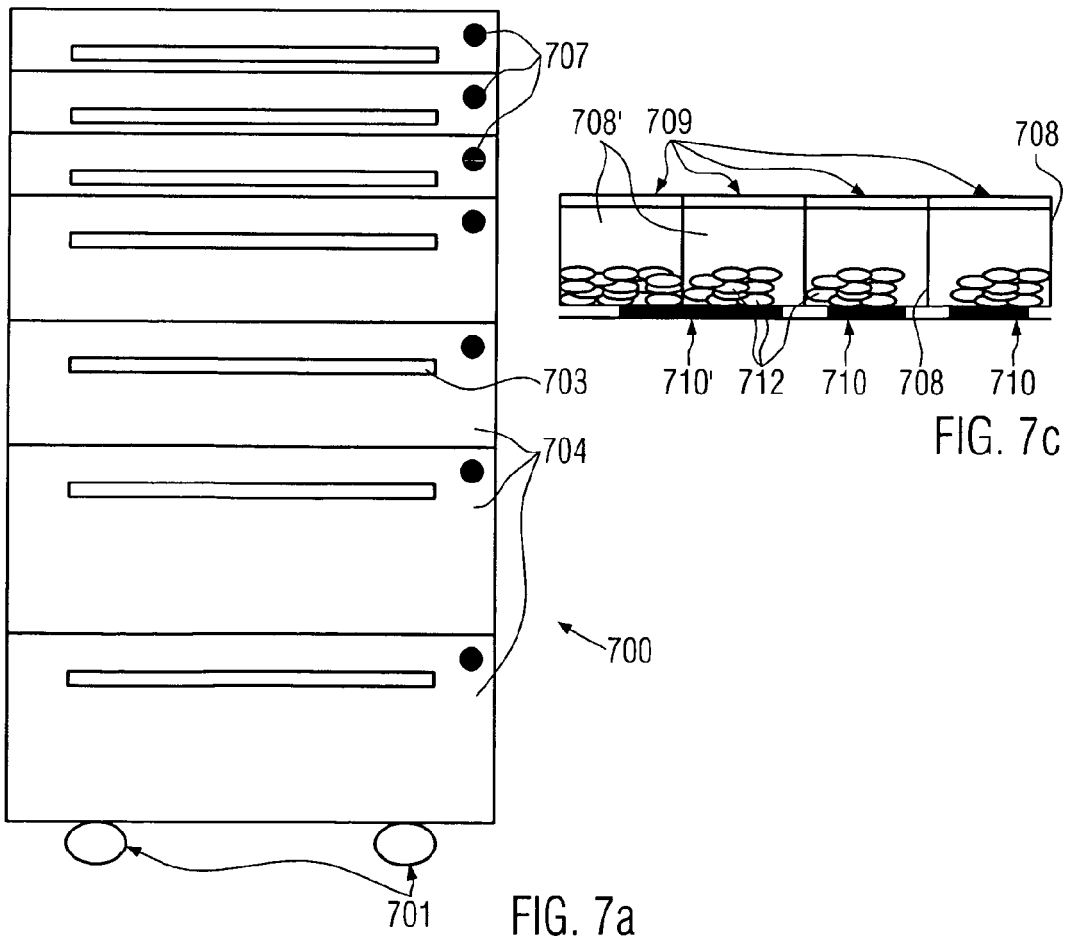
FIG. 7c
FIG. 7a

STOCK MONITORING

BACKGROUND OF THE INVENTION

1. Field of the Invention

The present invention relates to stock monitoring techniques, and more particularly to improving the accuracy and functionalities of electronic stock monitoring.

2. Discussion of the Related Art

In prior art systems, the amount of stock retrieved or removed from storage has been determined from changes in weight measurements for a bin or container for parts, knowing the unit weight of the part.

GB2299074A discloses a monitoring system for a storage system, comprising a plurality of bins or other storage means 10 containing stock, comprises sensing means 12 associated with the storage means 10 to monitor the contents of the storage means 10 and periodically to generate signals indicative of the contents of the storage means 10 and processing means 13 adapted to receive the signals of the contents of the storage means 10 and to compare the measured contents of each storage means 10 with a respective predetermined level of contents and, if the measured contents has fallen below the predetermined level of contents, to generate a signal to instigate an order to replenish the stock in the respective storage means 10.

However, a problem with such systems is that in order to measure stock movement from bins, weight sensors are read continuously; as weight sensors are subject to drift in their output readings, there is the significant possibility of miscounting stock quantities, especially in cases where the unit weight of the stock items is small.

SUMMARY OF THE INVENTION

This invention concerns systems and methods for providing monitoring of quantities of stock in an accurate and preferably secure manner, in storage environments where hand-portable stock items can be stored and accessed by a user or, more typically, a multitude of different users or employees. Such storage environments are typically found at manufacturing and other sites.

According to one aspect of the invention there is provided a method carried out in a stock monitoring system, the stock monitoring system comprising: a housing, one or more doors disposed in or on the housing, a sensor for sensing the condition of the door(s) and providing a door closed signal indicative of the door(s) having been closed by a user, one or more containers for stock items, located within the housing, the or each container having associated therewith a weight sensor for providing a weight signal indicative of the current weight of the container, and control circuitry, coupled for communication with the weight sensor(s); wherein the method comprises (a) receiving a door closed signal; (b) receiving one or more weight signals; (c) determining, for the or each container, the number of stock items removed from the container(s) by the user, from the weight signal(s) occurring during a predetermined sensing period, the predetermined sensing period being dependent upon the door closed signal.

Preferably, the predetermined sensing period comprises a first predetermined time period after the door closed signal. Preferably, the first predetermined time period is about 30 to about 90 seconds, for example about 60 seconds.

Preferably, (c) comprises, for the or each container, determining a current average weight of the container by averaging the weight signals over the predetermined sensing period; determining the weight difference for the container, the weight difference being the difference between the current average weight and the previously determined average weight; and dividing the weight difference by a weight unit stored in memory in association with an identifier for the container, thereby obtaining the number of stock items removed from the container by the user.

Preferably, the stock monitoring system further comprises a user ID sensor, adapted to be activated by a user and the method further comprises: (d) obtaining a user ID from the user ID sensor upon activation by a user; (e) determining if the user ID obtained is valid. The user ID sensor may be a swipe card reader, and (d) comprises extracting a user ID from a swipe card upon swiping by a user. Alternatively, the user ID sensor is a Dallas key sensor, and (d) comprises extracting a user ID from a Dallas key upon activation of the Dallas key sensor by a user using his Dallas key.

Preferably, the stock monitoring system further comprises one or more electrically controlled locks associated with the door(s), the lock(s) being electrically controllable such that the door(s) are in either a locked or releasable condition, the control circuitry being coupled for communication with the locks. The method may further comprise: (f) if door open conditions are met, priming the doors for opening, whereby the door(s) are in said releasable condition. In the alternative, (f) comprises: (f') if door open conditions are met, causing the door(s) to open, for example, to rotate to an open position. The door open conditions may comprise: (A) the obtained user ID is a valid ID, (B) the user ID obtained is different from the previously obtained user ID; and (C) the predetermined sensing period has elapsed; wherein the predetermined sensing period comprises a second predetermined time period after the door closed signal, different from the first predetermined time period. Alternatively, the door open conditions comprise: (D) the obtained user ID is a valid ID, (E) the user ID obtained is the same as the previously obtained user ID; and (F) the predetermined sensing period has not elapsed; wherein the predetermined sensing period comprises a second predetermined time period after the door closed signal, different from the first predetermined time period. Preferably, the second predetermined time period is about 10 to about 30 seconds, for example about 15 seconds.

Preferably, the method further comprises: (g) if the door(s) have not been opened by the user with a third predetermined time period after the doors have been primed for opening, activating the lock(s) so that the door(s) are in a locked condition. Preferably, the third predetermined time period is about 20 seconds to about 40 seconds, and is for example 30 seconds.

The doors comprise exterior doors. Each door may provide user access to a single container or to multiple containers.

Alternatively, the housing includes one or more drawers; each drawer having one or more compartments, and the doors comprise or include the lid(s) of the compartment(s).

In one embodiment, a single weight sensor is associated with a plurality of bins and/or compartments and provides a weight signal indicative of the combined weight of the plurality of bins or compartments.

The method may further comprise (h) obtaining, periodically or in response to user input, for one or more of the containers, an absolute weight reading from the weight sensor associated with the container, thereby obtaining the number of stock items in the container.

The method step (d) may include: determining whether the user ID sensed by the user ID sensor is a user ID of a first type, for users removing stock items, or a user ID of a second type, for users restocking the housing with stock items. In this embodiment, the method preferably further includes (j) if it is determined the obtained user ID is of the second type, determining, for the or each container, after a door closed signal is received, the number of stock items added thereto by the user performing restocking; and k) transmitting the number(s) of stock items to a server; and (k) storing number(s) of stock items in a file on the server.

Preferably, the stock control system further includes a display unit, the display unit including a indicator in a first colour, e.g. red, an indicator in a second colour, e.g. amber, and one or more indicators, including a main indicator, in a third colour, e.g. green, wherein the method preferably includes (l) illuminating the main indicator in the system ready state, in which a user ID sensing is awaited; and/or (m) if it is determined that an obtained user ID is not valid, illuminating the indicator in the second colour for a period, e.g. about 4 seconds, prior to illuminating the main indicator; and/or (n) if it is determined that an obtained user ID is valid, illuminating said one or more indicators in the third colour, and/or (o) in response to a door closed signal, switching off said one or more indicators in the third colour other than the main indicator, and illuminating the indicator in the second colour, and/or (p) following a door closed signal, and in response to the weight sensor reading being successfully transmitted, switching off said indicator in the second colour.

According to another aspect of the invention there is provided a stock monitoring system when suitably programmed for carrying out the method of any of claims 1 to 4 of the appended claims, the stock monitoring system comprising: a housing, one or more doors disposed in or on the housing, a sensor for sensing the condition of the door(s) and providing a door closed signal indicative of the door(s) having been closed by a user; one or more containers for stock items, located within the housing, the or each container having associated therewith a weight sensor for providing a weight signal indicative of the current weight of the container, and control circuitry, coupled for communication with the weight sensor(s).

According to another aspect of the invention there is provided a stock monitoring system when suitably programmed for carrying out the method of any of claims 5, 6 or 7 of the appended claims, the stock monitoring system comprising: a housing, one or more doors disposed in or on the housing, a sensor for sensing the condition of the door(s) and providing a door closed signal indicative of the door(s) having been closed by a user; one or more containers for stock items, located within the housing, the or each container having associated therewith a weight sensor for providing a weight signal indicative of the current weight of the container, control circuitry, coupled for communication with the weight sensor(s), and a user ID sensor, adapted to be activated by a user.

According to another aspect of the invention there is provided a stock monitoring system when suitably programmed for carrying out a method as previously described, the stock monitoring system comprising: a housing, one or more doors disposed in or on the housing, a sensor for sensing the condition of the door(s) and providing a door closed signal indicative of the door(s) having been closed by a user; one or more containers for stock items, located within the housing, the or each container having associated therewith a weight sensor for providing a weight signal indicative of the current weight of the container, control circuitry, coupled for communication with the weight sensor(s), a user ID sensor, adapted to be activated by a user, and one or more electrically controlled locks associated with the door(s), the lock(s) being electrically controllable such that the door(s) are in either a locked or releasable condition, the control circuitry being coupled for communication with the locks.

According to another aspect of the invention there is provided a stock monitoring system, comprising: a housing, one or more doors disposed in or on the housing, a sensor for sensing the condition of the door(s) and providing a door closed signal indicative of the door(s) having been closed by a user; one or more containers for stock items, located within the housing, the or each container having associated therewith a weight sensor for providing a weight signal indicative of the current weight of the container, control circuitry, coupled for communication with the weight sensor(s); wherein the control circuitry is operable for (a) receiving a door closed signal; (b) receiving one or more weight signals; (c) determining, for the or each container, the number of stock items removed from the container(s) by the user, from the weight signal(s) occurring during a predetermined sensing period, the predetermined sensing period being dependent upon the door closed signal.

Preferably, the predetermined sensing period comprises a first predetermined time period after the door closed signal. Preferably, the first predetermined time period is about 30 to about 90 seconds, for example about 60 seconds.

Preferably, (c) comprises for the or each container, determining a current average weight of the container by averaging the weight signals over the predetermined sensing period; determining the weight difference for the container, the weight difference being the difference between the current average weight and the previously determined average weight; dividing the weight difference by a weight unit stored in memory in association with an identifier for the container, thereby obtaining the number of stock items removed from the container by the user.

Preferably, the stock monitoring system further comprises a user ID sensor, adapted to be activated by a user and, wherein the control circuitry is operable for: (d) obtaining a user ID from the user ID sensor upon activation by a user; (e) determining if the user ID obtained is valid. The user ID sensor may be a swipe card reader, and (d) comprises extracting a user ID from a swipe card upon swiping by a user. Alternatively, the user ID sensor is a Dallas key sensor, and (d) comprises extracting a user ID from a Dallas key upon activation of the Dallas key sensor by a user using his Dallas key.

Preferably, the stock monitoring system further comprises one or more electrically controlled locks associated with the door(s), the lock(s) being electrically controllable such that the door(s) are in either a locked or releasable condition, the control circuitry being coupled for communication with the locks. The control circuitry may be operable for: (f) if door open conditions are met, priming the doors for opening, whereby the door(s) are in said releasable condition. Alternatively, the control circuitry may be operable for (f') if door open conditions are met, causing the door(s) to open, for example, to rotate to an open position. The door open conditions may comprise: (A) the obtained user ID is a valid ID, (B) the user ID obtained is different from the previously obtained user ID; and (C) the predetermined sensing period has elapsed; wherein the predetermined sensing period comprises a second predetermined time period after the door closed signal, different from the first predetermined time period. Alternatively, the door open conditions comprise: (D) the obtained user ID is a valid ID, (E) the user ID obtained is the same as the previously obtained user ID; and (F) the predetermined sensing period has not elapsed; wherein the predetermined sensing period comprises a second predetermined time period after the door closed signal, different from the first predetermined time period. Preferably, the second predetermined time period is about 10 to about 30 seconds, for example about 15 seconds.

The control circuitry may be operable for: (g) if the door(s) have not been opened by the user with a third predetermined time period after the doors have been primed for opening, activating the lock(s) so that the door(s) are in a locked condition. Preferably, the third predetermined time period is about 20 seconds to about 40 seconds, and is for example 30 seconds.

The doors comprise exterior doors. Each door may provides user access to a single container or to multiple containers.

Alternatively, the housing includes one or more drawers; each drawer having one or more compartments, and the doors comprise or include the lid(s) of the compartment(s).

In one embodiment, a single weight sensor is associated with a plurality of bins and/or compartments and provides a weight signal indicative of the combined weight of the plurality of bins or compartments.

The control circuitry may be operable for: (h) obtaining, periodically or in response to user input, for one or more of the containers, an absolute weight reading from the weight sensor associated with the container, thereby obtaining the number of stock items in the container.

The control circuitry may be operable such that (d) includes: determining whether the user ID sensed by the user ID sensor is a user ID of a first type, for users removing stock items, or a user ID of a second type, for users restocking the housing with stock items. Preferably, the control circuitry is operable for: (i) if it is determined the obtained user ID is of the second type, determining, for the or each container, after a door closed signal is received, the number of stock items added thereto by the user performing restocking; and (j) transmitting the number(s) of stock items to a server; and (k) storing number(s) of stock items in a file on the server.

Preferably, the stock control system further includes a display unit, the display unit including a indicator in a first colour, e.g. red, an indicator in a second colour, e.g. amber, and one or more indicators, including a main indicator, in a third colour, e.g. green. Preferably, control circuitry is operable for: (l) illuminating the main indicator in the system ready state, in which a user ID sensing is awaited; and/or (m) if it is determined that an obtained user ID is not valid, illuminating the indicator in the second colour for a period, e.g. about 4 seconds, prior to illuminating the main indicator; and/or (n) if it is determined that an obtained user ID is valid, illuminating said one or more indicators in the third colour, and/or (o) in response to a door closed signal, switching off said one or more indicators in the third colour other than the main indicator, and illuminating the indicator in the second colour, and/or (p) following a door closed signal, and in response to the weight sensor reading being successfully transmitted, switching off said indicator in the second colour.

According to another aspect of the invention there is provided a recordable, rewritable or recorded medium having recorded or stored thereon machine readable data defining or transformable into instructions for execution by processing circuitry and corresponding to at least the steps previously described.

According to another aspect of the invention there is provided a server computer incorporating a communications device and a memory device and being adapted for transmission on demand or otherwise of data defining or transformable into instructions for execution by processing circuitry and corresponding to at least the steps previously described.

Using techniques according to the invention, rather than continuously sensing weight measurements from weight sensors or load cells, the measurements are taken only for a relatively short period after the doors of the housing have been closed by a user (typically after removal of stock by the user). Weight measurements are averaged over a period of one minute, or at least over a period of at least 15 seconds or so. In this way, measurements are more accurate and effects of weight measurement drift are reduced or eliminated. So the accuracy in counting quantities of stock removed is increased, in some cases exceeding 99% accuracy.

BRIEF DESCRIPTION OF THE DRAWINGS

Embodiments of the invention will now be described in detail, by way of example, with reference to the accompanying drawings, in which:

FIGS. 4A and 4B are a flow chart showing the main processing steps and operations in implementing stock monitoring according to the first embodiment;

FIGS. 7A-7C shows a housing or cabinet employed in the stock monitoring system according to a third embodiment of the invention, employing compartmentalised drawers, with (a) a lateral front view of the drawers, and (b) plan and (c) side views of a drawer;

DETAILED DESCRIPTION OF THE PREFERRED EMBODIMENTS

In the following, like numerals will be used to denote like elements. Certain techniques disclosed in GB2299074A may be employed in implementing the present invention, as appropriate, except as described hereinafter. Stock items may be, for example, automotive components, electrical components or fasteners and PPE and MRO consumables. In general every item contained in each particular bin 10 will be identical, but this is not essential. Equally, "stock items" may refer to consumable products or parts, re-usable products or parts, finished products or articles, tools, items of clothing, or any other item that is stored in pluralities and may be used or re-used by one or more persons.

Figures 1A, 1B:
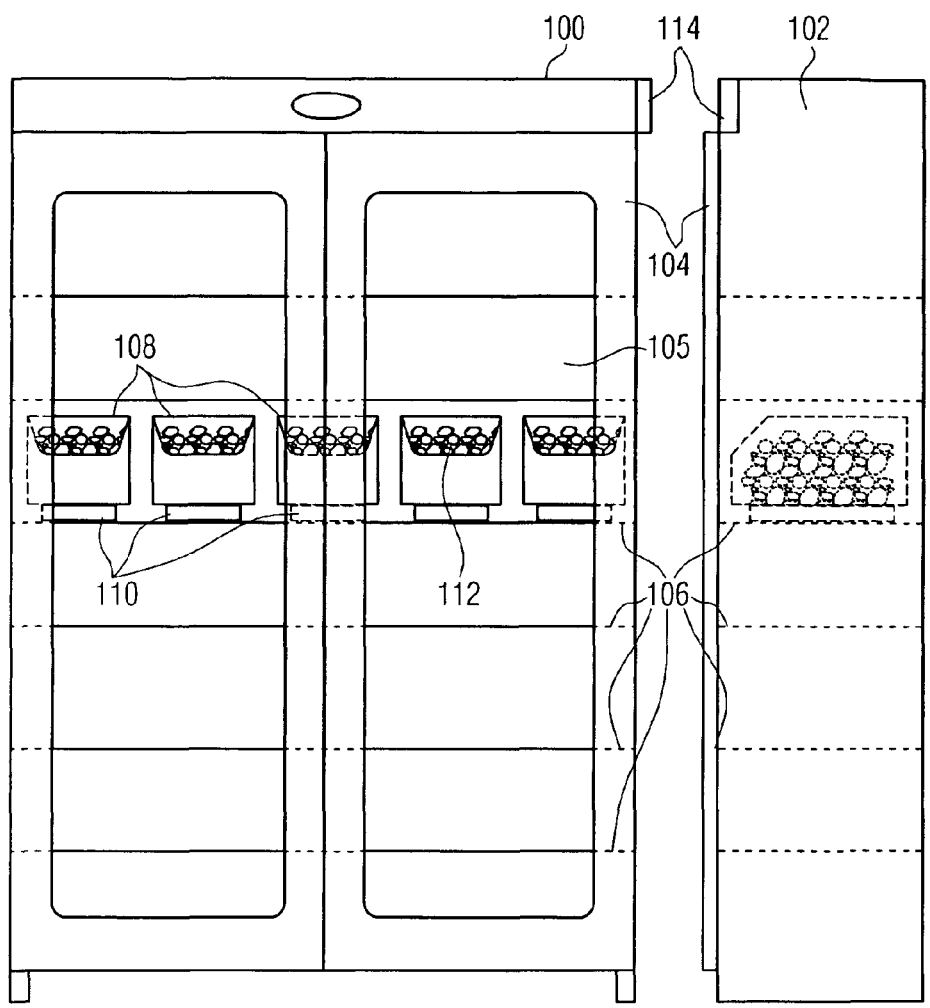
FIG. 1 shows a housing or cabinet employed in the stock monitoring system according to a first embodiment of the invention.

FIG. 1 shows a housing or cabinet employed in the stock monitoring system according to a first embodiment of the invention, (a) in front view and (b) in side view. The cabinet 100 comprises a main body 102 and a pair of doors 104 having transparent (e.g. glass, Perspex) panels 105. Here, two doors are illustrated, but 1, 3 or more may be used. The doors 104 and main body 102 are suitably made of steel, but any other suitably strong and rigid material may be used.

A plurality of shelves 106 are provided within the cabinet 100, on each of which are mounted a plurality of storage bins 108 (here, for simplicity, only one shelf 106 is shown supporting bins). Each bin 108 sits on top of a weight sensor, suitably comprising a load cell 110 as is known to persons skilled in the art, each load cell 110 providing an anolog signal indicating the weight of the bin 108 it is supporting. (in alternative embodiments, there may be one load cell 110 for two or more bins 108). Each bin 108 stores stock items 112. Stock may be, for example, automotive components, electrical components or fasteners. In general every item contained in each particular bin 108 will be identical.

Provided at the top right corner of the cabinet 100 is a swipe card reader 114 which is able to read swipe cards belonging to users (e.g. factory employees) and, depending on the ID extracted from the swipe card, cause the doors to be released for opening by the user, or not. Although, in this embodiment, a swipe card reader is used, it will be appreciated that other means of obtaining the user ID may be used, including, for example, IR or short range radio based portable devices, barcode readers, RFID systems, biometric (e.g. fingerprint, retina scan) devices, and so forth. Dalls keys may also be used.

Figure 2A:
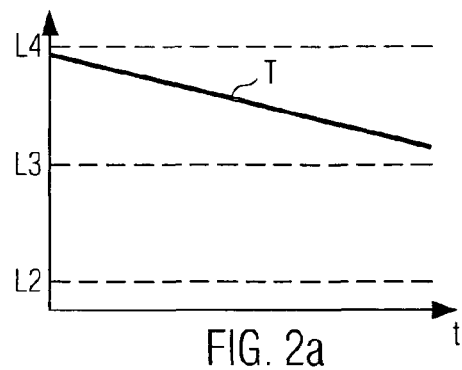
FIGS. 2A and 2B illustrate the effect of weight sensor drift.
Figure 2B:
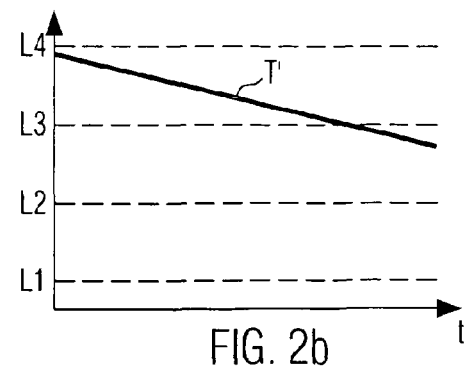

FIG. 2 illustrates the effect of weight sensor drift. In FIGS. 2(a) and (b), the weight signal output by the load cell 110 against time t is indicated by traces T and T' respectively, the levels L1 to L4 indicate the transition between different numbers (quantities) being recorded as being within the respective bin 108.

As shown, although highly exaggerated, the traces T, T' are not flat (constant), but drift. In the case of FIG. 2(a) the stock items 112 are of a higher unit weight than those for FIG. 2(b). Thus, for FIG. 2(a), the drift does not cause a false reading, but in FIG. 2(b), the drift is such as to pass through threshold level L3, meaning that the weight signal sent by the load cell corresponds to a quantity in the bin that is false, i.e. is one less than the actual value.

Figure 5:
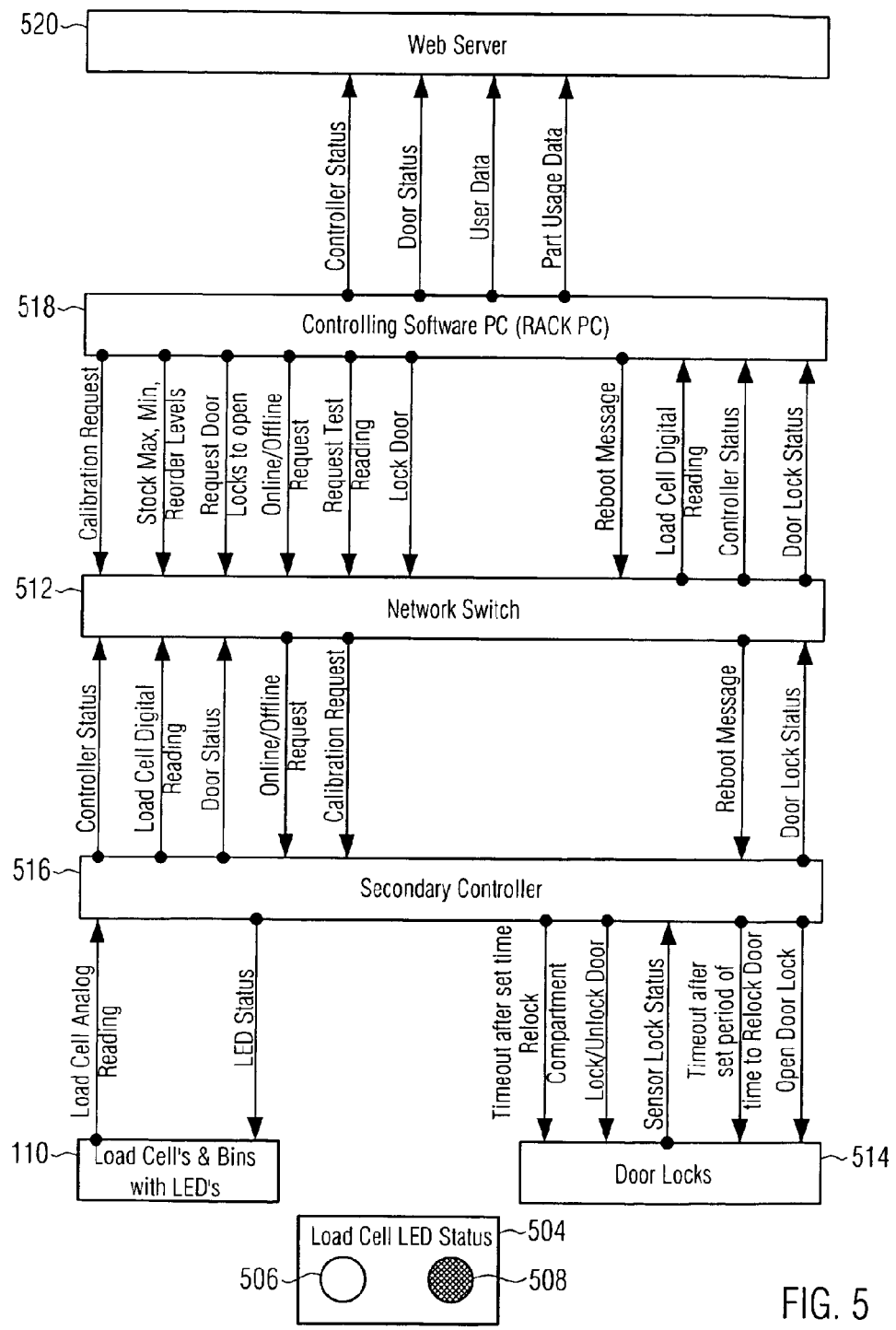
FIG. 5 is a schematic block diagram showing the main electrical components in the stock monitoring system according to a second embodiment of the invention.
Figure 6A:
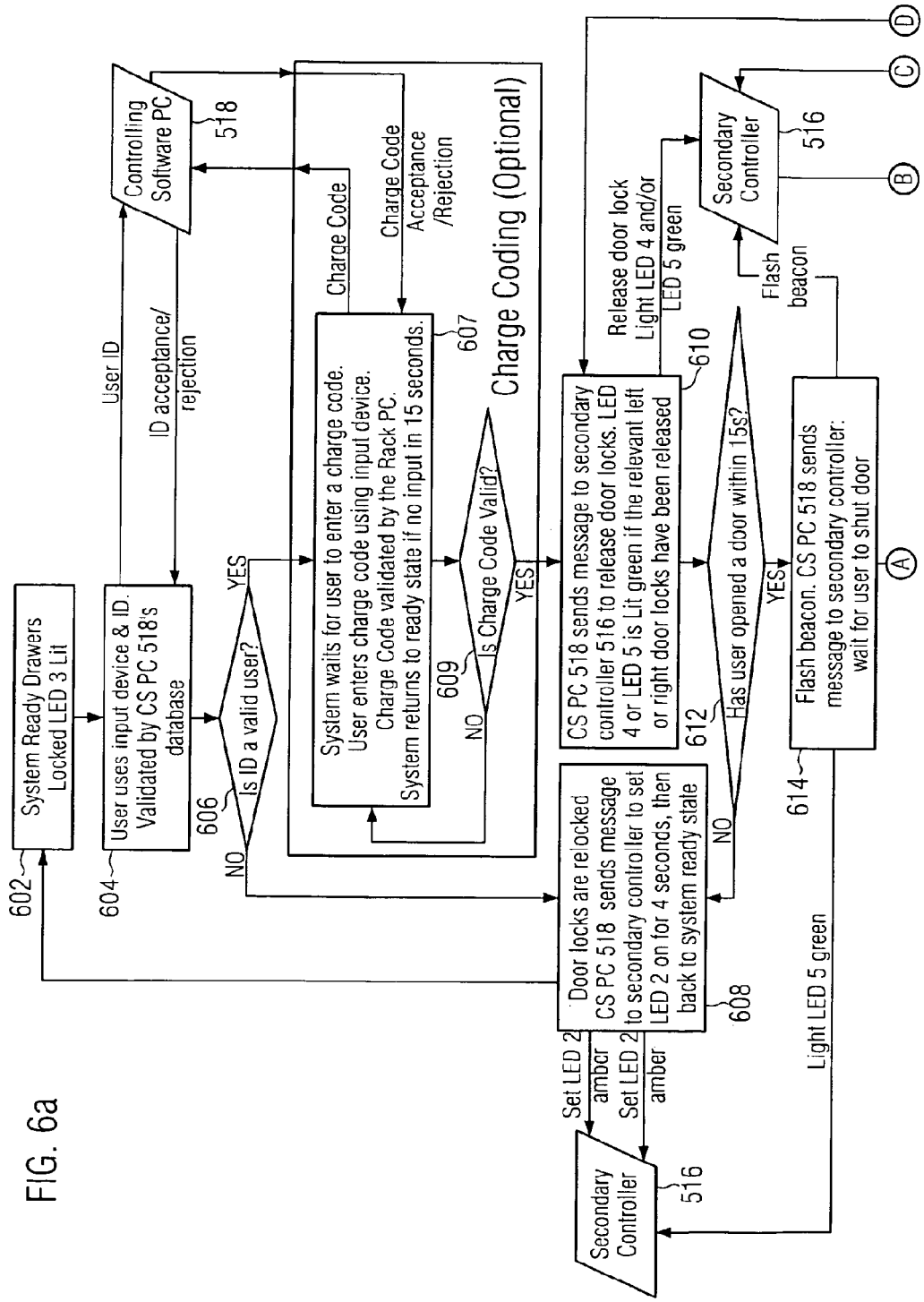
FIGS. 6A and 6B are a flow chart showing the main processing steps and operations in implementing stock monitoring according to the second embodiment.
Figure 6B:
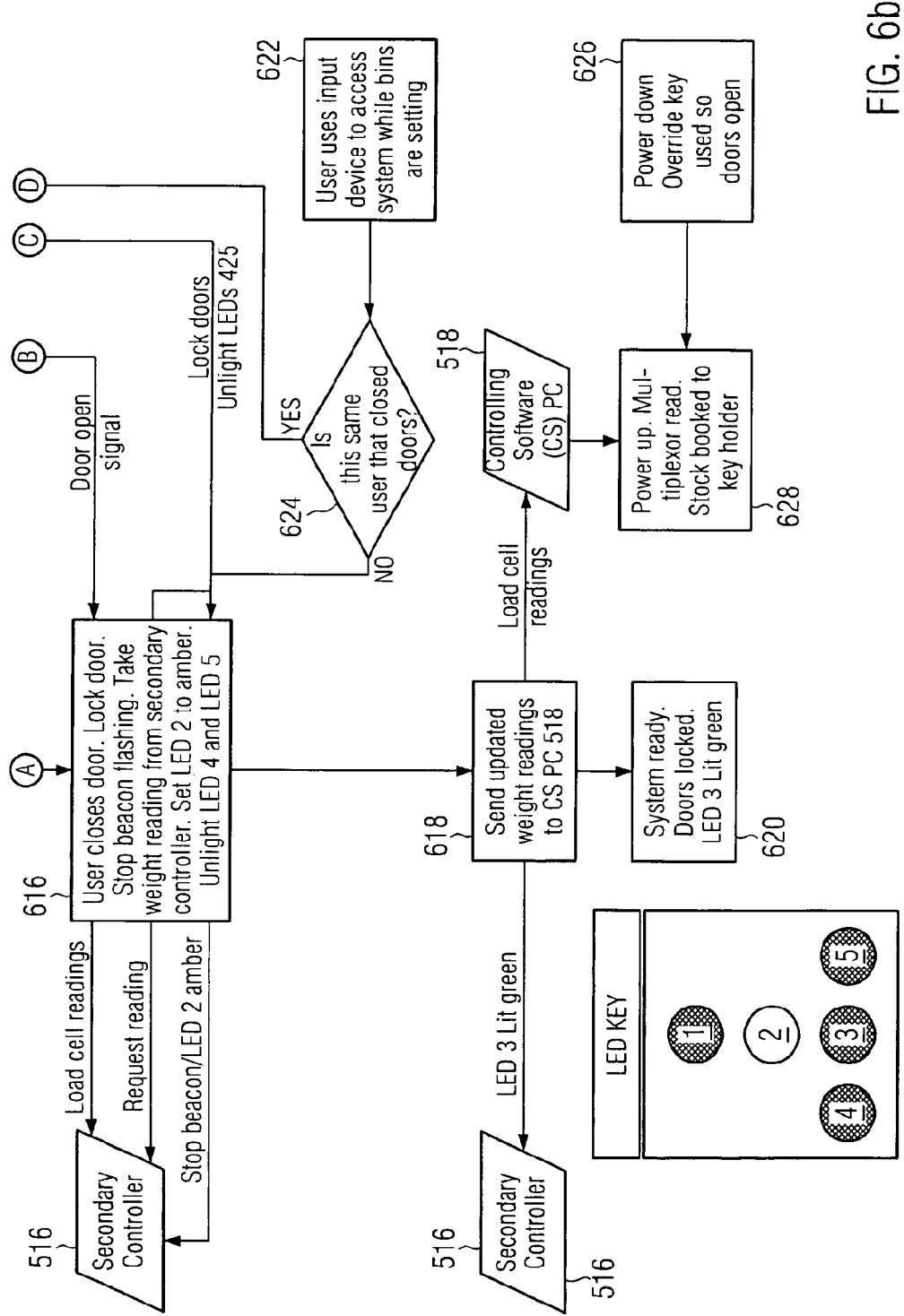

For the cabinet-based system with doors (FIG. 1), there are two variants of the system. The first variant, shown in FIGS. 3 and 4, has a separate multiplexor 302, Vlinx Box 310 and controller 316. The second variant, shown in FIGS. 5 and 6, is essentially the same as the first, except that it has one controller (516) replacing multiplexor 302, Vlinx Box 310 and controller 316. In a first variant, the locks to the doors in are primed for release and have to be pushed to be released. In a second variant, the locks to the doors in are released automatically when the card is swiped.

Figure 3:
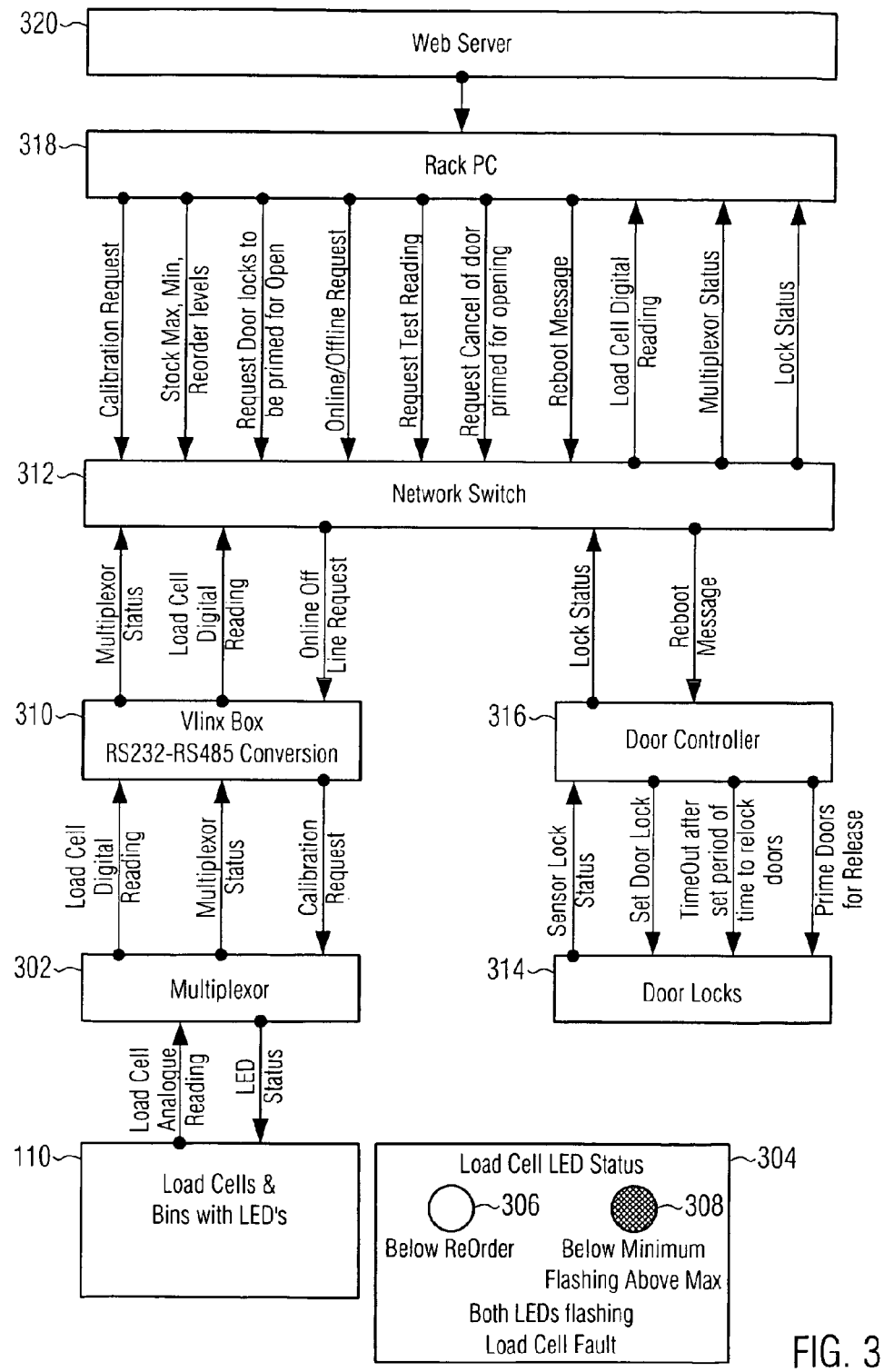
FIG. 3 is a schematic block diagram showing the main electrical components in the stock monitoring system according to the first embodiment.

FIG. 3 is a schematic block diagram showing the main electrical components in the stock monitoring system according to a first embodiment of the invention. Each load cell 110 (only one of which is shown) is coupled to a multiplexer 302. The load cells 110 send analog weight readings to the multiplexer 302 and receive LED status signals from the multiplexer 302. As indicated by the key 304, each load cell 110 incorporates or is coupled to and associated with, a simple status indicator (e.g. using LEDs), including amber left LED 306 and a right red LED 308. The status currently being indicated by the LEDs is as set out in the diagram (key 304).

Multiplexer 302 averages weight readings received from the load cell(s) 110 and converts the analog average reading to a digital reading. The multiplexer 302 sends load cell digital readings and multiplexer status signals to a serial-to-Ethernet conversion unit 310, and receives therefrom, when appropriate, calibration requests (e.g. when an absolute weight measurement of one or more of the bins 108 is performed). The serial-to-Ethernet conversion unit 310 suitably comprises a Vlinx™ Ethernet serial server available from B&B Electronics Ltd, Co. Galway, Ireland (see, for example (a) http://www.bb-elec.com/product_family.asp?familyid=2 and (b) http://www.bb-elec.com/bb-elec/literature/ESP904-4105ds.pdf). The serial-to-Ethernet 310 connects, configures, and communicates with serial devices over Ethernet using a single IP address. The unit uses DB9 male serial connectors and supports RS-232, RS-422 and RS-485. The serial-to-Ethernet conversion unit 310 transmits load cell digital readings and multiplexer status signals to a network switch 312 and receives therefrom online/offline request signals.

The network switch 312 is of the type well known to persons skilled in the art for implementing Ethernet based LAN or WAN systems, enabling computers to communicate using TCP/IP, Ethernet and other protocols.

Referring briefly to FIG. 1, the doors 104 can be locked using electrically controlled locks (not shown in FIG. 1). These locks are of the type known in the art (e.g. part no. INV02, available from Inventor-e Ltd). The locks are designated 314 in FIG. 3. In this embodiment, these are activated (locking doors 104 (FIG. 1)) after both doors are shut.

The locks 314 send lock status signals to a door controller 316. Also, the locks 314 receive control signals from the door controller 316 as follows:
"Set door lock"
"Timeout" (after set period of time to relock doors), and
"Prime doors for release".
The door controller 316 may be any suitable microprocessor-based controller known in the art.

The door controller 316 sends lock status signals to the network switch 312 and receives therefrom, when appropriate, reboot messages.

The network switch 312 is further coupled to a rack PC 318. This is a computer with standard (PC) architecture, with mountings, components/interfaces and specifications for use in industrial environments. Rack PC 318 suitably
    stores a database (of user IDs) for controlling door access
    processes load cell readings and converts them to quantities of parts/stock items
    stores Part IDs, part unit weights, user IDs and location IDs.

Optionally, the rack PC 318 is coupled to a web server 329 and sends stored and derived data thereto. In turn, the web server 320 is able to supply on demand (e.g. over internet and subject to password access) reports on data obtained from the rack PC, enabling a remote user (e.g. supplier) to view reports and download (e.g. into a suitable software package such as MS Excel).

The link between the multiplexer 302 and the rack PC 318 may be a wired link, using suitable network hardware and protocols. Alternatively, a suitable wireless link may be used, e.g. GPRS.

Referring to the load cells 110 in FIG. 3, although the display has been indicated as a simple LED display, in an alternative embodiment the load cells incorporate or are associated with a display (e.g. LCD) that displays the current total quantity of items in the respective bin 108 based on data received from the rack PC 318.

Figure 4B:
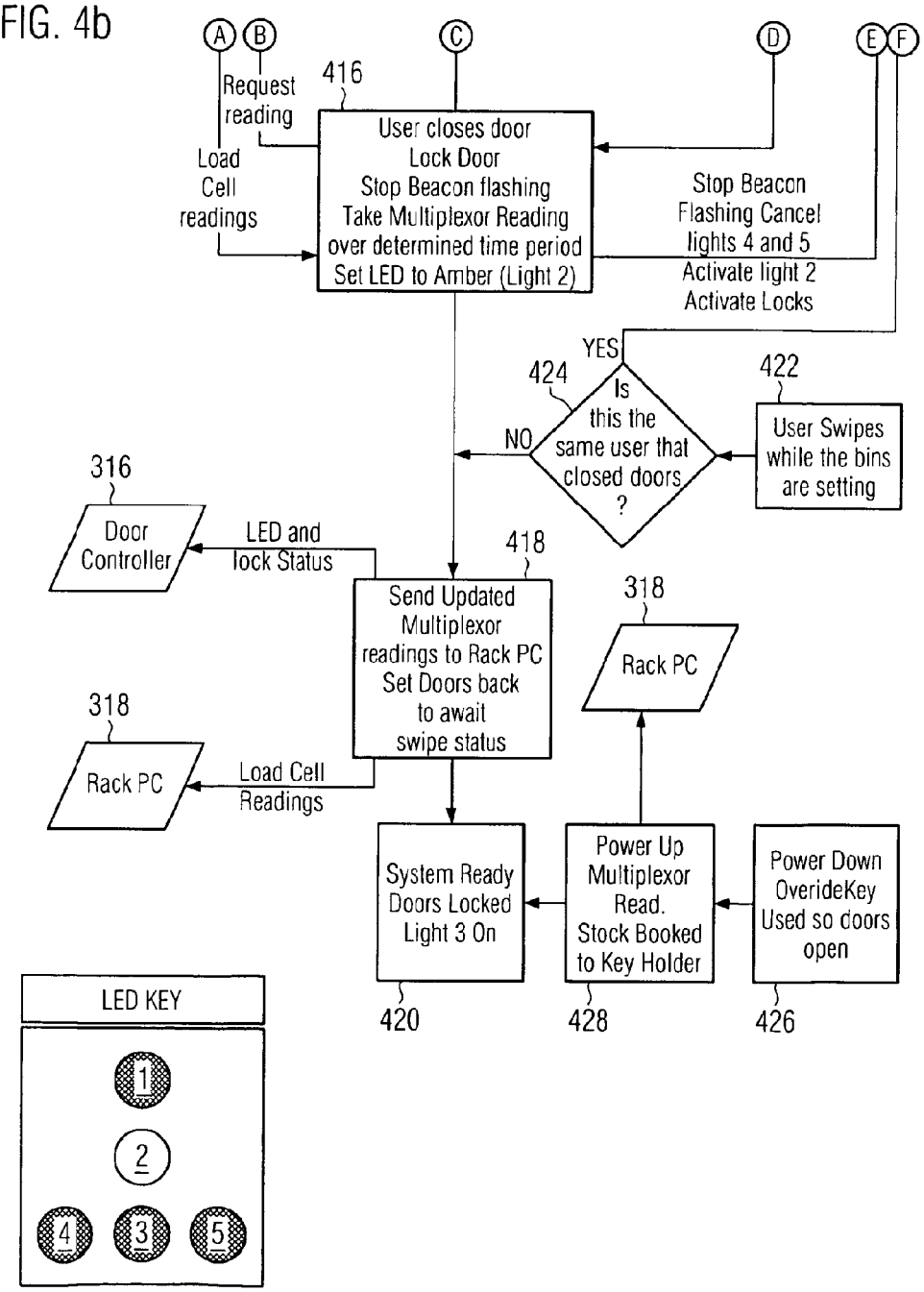

FIG. 4 is a flow chart showing the main processing steps and operations in implementing stock monitoring according to the first embodiment of the invention. Commencing at 402, here the stock monitoring system is in a "system ready" state, ready for a user to attempt to access the cabinet 100. In addition (see bottom left of FIG. 4), mounted in or on the cabinet 100, coupled to the door controller 316 and visible to the user is a user display incorporating a number of LEDs.

This includes upper red LED (1), a middle amber LED (2) and three green lower LEDS (3), (4), (5). In the "system ready" state, green LED (3) is illuminated.

At 404, a user swipes his swipe card through the card reader (114 in FIG. 1). Then, the extracted card (user) ID is sent to the rack PC 318, and a card acceptance/rejection message returned (depending on whether the user ID is an authorised/valid ID in the database stored on rack PC 318).

The two possibilities are indicated at 406. As indicated at 408, if the card (ID) is not valid, then doors 104 are not primed for opening, the rack PC 318 send a message to the door controller 316 to display a predetermined indication. At 408 (FIG. 4), an LED status message is sent to the door controller to illuminate LED (2) for 4 seconds, prior to returning to the "system ready" state, with only LED (3) illuminated.

If the determination was that the card (user) ID was valid (406), the rack PC 318 then sends (410) a message to the door controller 316 to prime the doors for opening (i.e. the locks 314 are electrically released; and the user can simply push the doors inward to release a latch (not shown), before opening the doors). Also, green LEDs (3), (4) and (5) are illuminated. As indicated at 412, if the user has not pushed the doors to open within 30 seconds, processing returns to 408.

Once the user does push the doors to open within 30 seconds, a beacon (LED) is set (414) flashing (signal to door controller 316) until the user shuts the door. At 416 a door closed signal has been received, indicating that the user has closed the doors. A message is sent to the door controller 316 to cease flashing the beacon. LEDs (4) and (5) are switched off, LED (2) (amber) illuminated, and the locks are activated to lock the doors.

Also at 416, a request reading signal is sent to the multiplexer 302, in response to which load cell readings are returned. Then, at 418, updated multiplexer (digital weight) readings are sent to the rack PC 318, and a LED and lock status signal is sent to the door controller 316 (i.e. returning the system to the "system ready" state.

As indicated at 420, the doors are now locked, and LED (3) ("system ready") illuminated.

The above-described process is applicable when a card is swiped after a predetermined interval (e.g. 15 seconds) after the doors were last closed. However, if there is a card swipe (422) within that period, a check (424) is made to determine whether it was by the same user as the previous occasion. If not, processing moves to 418, and if so, processing moves to 410.

Another procedure is indicated at 426, 428. This may be used, for example, if the rack PC 318 is for some reason non-operational. Here, an override key is used in the swipe card reader 114 (FIG. 1), so that the doors can be opened (426). Then, the multiplexer 302 reads the weight readings from the load cells 110, calculates the numbers of stock items removed, and books (stores in database in memory) the amount to the recorded owner of the key. Processing then proceeds to 420.

FIG. 5 is a schematic block diagram showing the main electrical components in the stock monitoring system according to a second embodiment of the invention. This is the same as the first embodiment, except as described hereafter. Each load cell 110 (only one of which is shown) is coupled to a secondary controller 516. The load cells 110 send analog weight readings to the secondary controller 516 and receive LED status signals from the secondary controller 516. As indicated by the key 504, each load cell 110 incorporates or is coupled to and associated with, a simple status indicator (e.g. using LEDs), including amber left LED 506 and a right red LED 508. The key 504 is the same as key 304 in FIG. 3.

Secondary controller 516 averages weight readings received from the load cell(s) 110 and converts the analog average reading to a digital reading. The secondary controller 516 transmits load cell digital readings and multiplexer status signals to a network switch 512 and receives therefrom online/offline request signals.

The secondary controller 516 incorporates or implements a multiplexor (not shown; see FIG. 3) and an access controller (not shown).

Referring briefly to FIG. 1, the doors 104 can be locked using electrically controlled locks, designated 514 in FIG. 5. The locks 514 send lock status signals to a secondary controller 516. Also, the locks 514 receive control signals from the secondary controller 516—

"Set door lock"

"Timeout" (after set period of time to relock doors), and

"Release Door Lock".

The secondary controller 516 may be any suitable microprocessor-based controller known in the art, for example model/part no. SS01, available from Inventor-e Ltd.

The secondary controller 516 sends lock status signals to the network switch 512 and receives therefrom, when appropriate, reboot messages. The network switch 512 is further coupled to a Controlling Software PC 518 (also referred to herein as Rack PC). This is a computer with standard (PC) architecture, with mountings, components/interfaces and specifications for use in industrial environments. Controlling Software PC 518 suitably stores a database (of user IDs) and (optionally) charge code ID's for controlling door access processes load cell readings and converts them to quantities of parts/stock items stores Part IDs, part unit weights, user IDs and location IDs.

Optionally, the Controlling Software PC 518 is coupled to a web server 520 and sends stored and derived data thereto. In turn, the web server 520 is able to supply on demand (e.g. over internet and subject to password access) reports on data obtained from the rack PC, enabling a remote user (e.g. supplier) to view reports and download (e.g. into a suitable software package such as MS Excel).

The link between the secondary Controller 516 and the Controlling Software PC 518 may be a wired link, using suitable network hardware and protocols. Alternatively, a suitable wireless link may be used, e.g. GPRS.

FIG. 6 is a flow chart showing the main processing steps and operations in implementing stock monitoring according to an embodiment of the invention. Commencing at 602, here the stock monitoring system is in a "system ready" state, ready for a user to attempt to access the cabinet 100. In addition (see bottom left of FIG. 6), mounted in or on the cabinet 100, coupled to the secondary controller 516 and visible to the user is a user display incorporating a number of LEDs. This includes upper red LED (1), a middle amber LED (2) and three green lower LEDS (3), (4), (5). In the "system ready" state, green LED (3) is illuminated.

At 604, a user swipes his swipe card through the card reader (114 in FIG. 1). Then, the extracted card (user) ID is sent to the Controlling Software PC 518, and a card acceptance/rejection message returned (depending on whether the user ID is an authorised/valid ID in the database stored on Controlling Software PC 518).

The two possibilities are indicated at 606. As indicated at 608 (see FIG. 6(*d*)), if the card (ID) is not valid, then doors 104 are relocked, the Controlling Software PC 518 sends a message to the secondary controller 516 to display a predetermined indication. An LED status message is sent to the door controller to illuminate LED (2) for 4 seconds, prior to returning to the "system ready" state, with only LED (3) illuminated.

If the determination was that the card (user) ID was valid (606), depending on configuration, the user may be required to enter a charge code (see FIG. 6(*c*)). If this is setup, the user is asked (607) for this charge code, or if not, the system releases the locks (610). At 607 the user enters a charge code using the input device 116. The latter can be a number of said devices including bar code reader, touch screen, keypad. Then, the extracted charge code is sent to the Controlling Software PC 518, and a charge code acceptance/rejection message returned (depending on whether the charge code ID is an authorised/valid charge code in the database stored on Controlling Software PC 518).

The two possibilities are indicated at 609. As indicated at 607, if the charge code (ID) is not valid, then doors 104 do not have there locks released, the Controlling Software PC 518 sends a message to the secondary controller 516 to display a predetermined indication. At 607 (FIG. 6(*c*)), if the user doesn't enter a charge code within 15 seconds, an LED status message is sent to the secondary controller 516 to illuminate LED (2) for 4 seconds, prior to returning to the "system ready" state, with only LED (3) illuminated. If the determination was that the charge code was valid (609) the system proceeds to (610).

The Controlling Software PC 518 then sends (610) a message to the secondary controller 516 to release the locks (i.e. the locks 514 are electrically released; and the user can simply pull the doors outward). Also, green LEDs (3), (4) and (5) are illuminated. As indicated at 612, if the user has not pushed the doors to open within 30 seconds, processing returns to 608.

Once the user does open the doors within 30 seconds, a beacon (LED) is set flashing 614 (signal to secondary controller 516) until the user shuts the door. At 616 a door closed signal has been received (see FIG. 6(*f*)), indicating that the user has closed the doors. A message is sent to the secondary controller 516 to cease flashing the beacon. LEDs (4) and (5) are switched off, LED (2) (amber) illuminated, and the locks are activated to lock the doors.

Also at 616 (FIG. 6(*f*)), a request reading signal is sent to secondary Controller 516, in response to which load cell readings are returned. Then, at 618, updated digital weight readings are sent by secondary Controller to the Controlling Software PC 518, and a LED and lock status signal is sent to the secondary controller 516 (i.e. returning the system to the "system ready" state).

As indicated at 620, the doors are now locked, and LED (3) ("system ready") illuminated.

The above-described process is applicable when a card is swiped after a predetermined interval (e.g. 15 seconds) after the doors were last closed. However, if there is a card swipe (622) within that period, a check (624) is made to determine whether it was by the same user as the previous occasion. If not, processing moves to 618, and if so, processing moves to 610.

Another procedure is indicated at 626, 628. This may be used, for example, if the Controlling Software PC 518 is for some reason non-operational. Here, a mechanical override key is used, so that the doors can be opened (626). Then, the Inventor-e Controller 516 reads the weight readings from the load cells 110, calculates the numbers of stock items removed, and books (stores in database in memory) the amount to the recorded owner of the key. Processing then proceeds to 620.

FIG. 7 shows a housing or cabinet employed in the stock monitoring system according to a third embodiment of the invention, employing compartmentalised drawers, with (a) a lateral front view of the drawers, and (b) plan and (c) side views of a drawer. As seen in FIG. 7(*a*), a housing 700 is in the form of a chest of drawers, each drawer 704 being openable by the user using handle 703. The housing 700 is suitably mounted on casters 701. In addition, each drawer 704 has a respective drawer LED 707. FIG. 7(*b*) shows a single drawer 704 from above, the drawer 704 having a plurality (here 16) compartments, each being covered by a lockable lid 709. In turn, a lid LED 711 is provided for each lid 709, as a status indicator. The drawers 704 may also be lockable.

The side view of a drawer, in FIG. 7(*c*), shows compartments or bins 708, 708', each containing parts or stock items 712. Each compartment 708 has its own associated load cell 710, for sensing weight changes due to addition/removal of parts. In some cases, a single load cell 710' may be provided for measuring weight changes of two or more adjacent compartments 708' (in which case the per unit part weight may be the same or different in the adjacent compartments 708').

Figure 8:
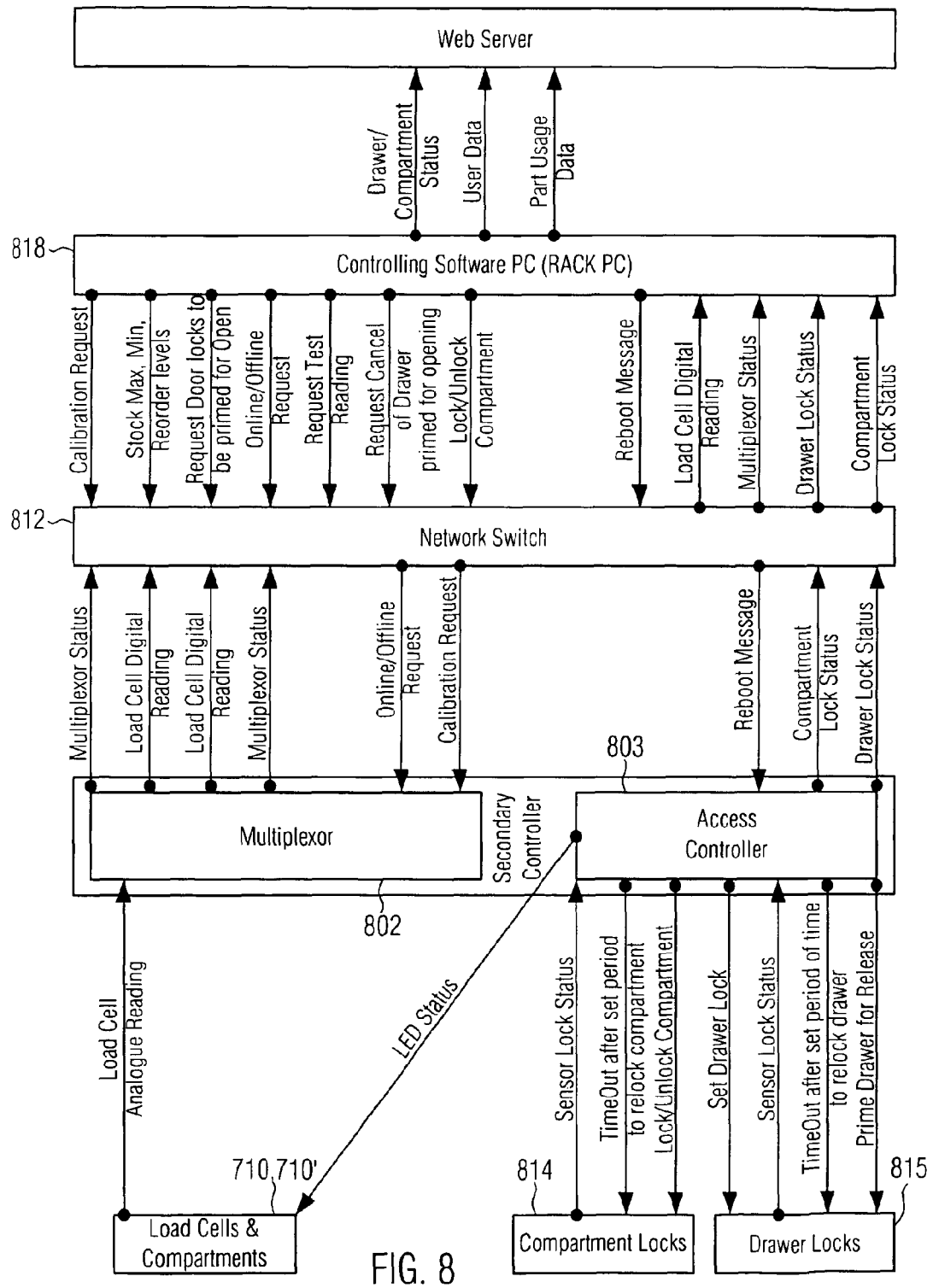
FIG. 8 is a schematic block diagram showing the main electrical components in the stock monitoring system according to the third embodiment.

FIG. 8 is a schematic block diagram showing the main electrical components in the stock monitoring system according to the third embodiment. This is the same as for the second embodiment, except as described hereafter. In this embodiment, both compartment locks 814 and drawer locks 815 are provided, which lock compartments 708, 708' and drawers 704, respectively, after they have (been) closed. The secondary controller 816, incorporates multiplexor 802 and access controller 803. The access controller— sends LED status commands to the load cells & compartments, sends signals to the compartment locks to (i) timeout after a set period to relock a compartment, and (ii) lock/unlock compartments, and sends signals to the rawer locks to (i) timeout after a set period to relock a drawer, and (ii) set drawer locks The access controller 803 sends signals indicating compartment lock status and drawer lock status to the network switch 812. In turn, the network switch 812 sends signals indicating compartment lock status and drawer lock status to the controlling software (CS) PC 818. The CS PC 818 sends signals in the other direction to (a) request cancelling of a drawer primed for opening and (b) lock/unlock a compartment.

Figure 9A:
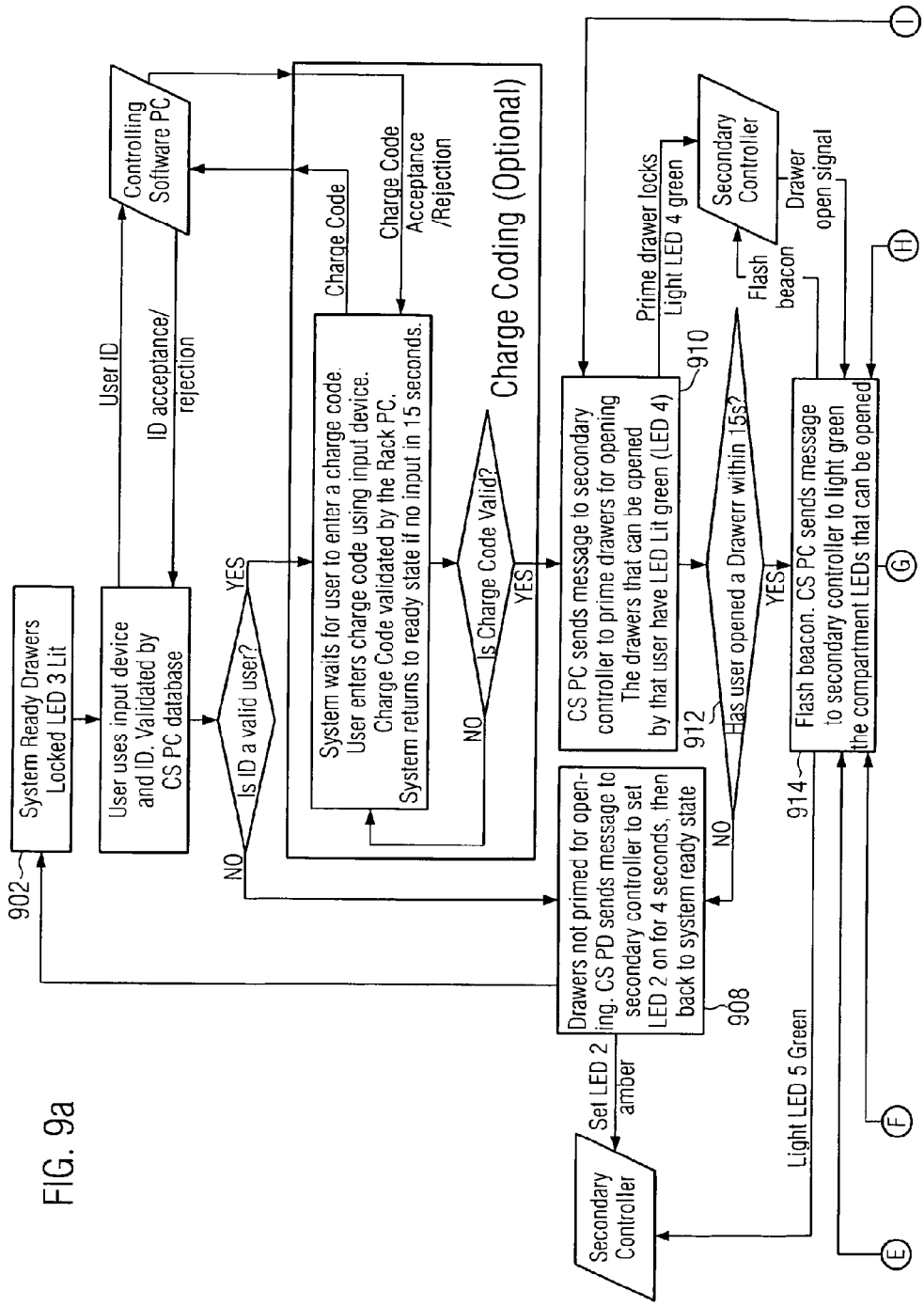
FIGS. 9A-9C are a flow chart showing the main processing steps and operations in implementing stock monitoring according to the third embodiment.
Figure 9B:
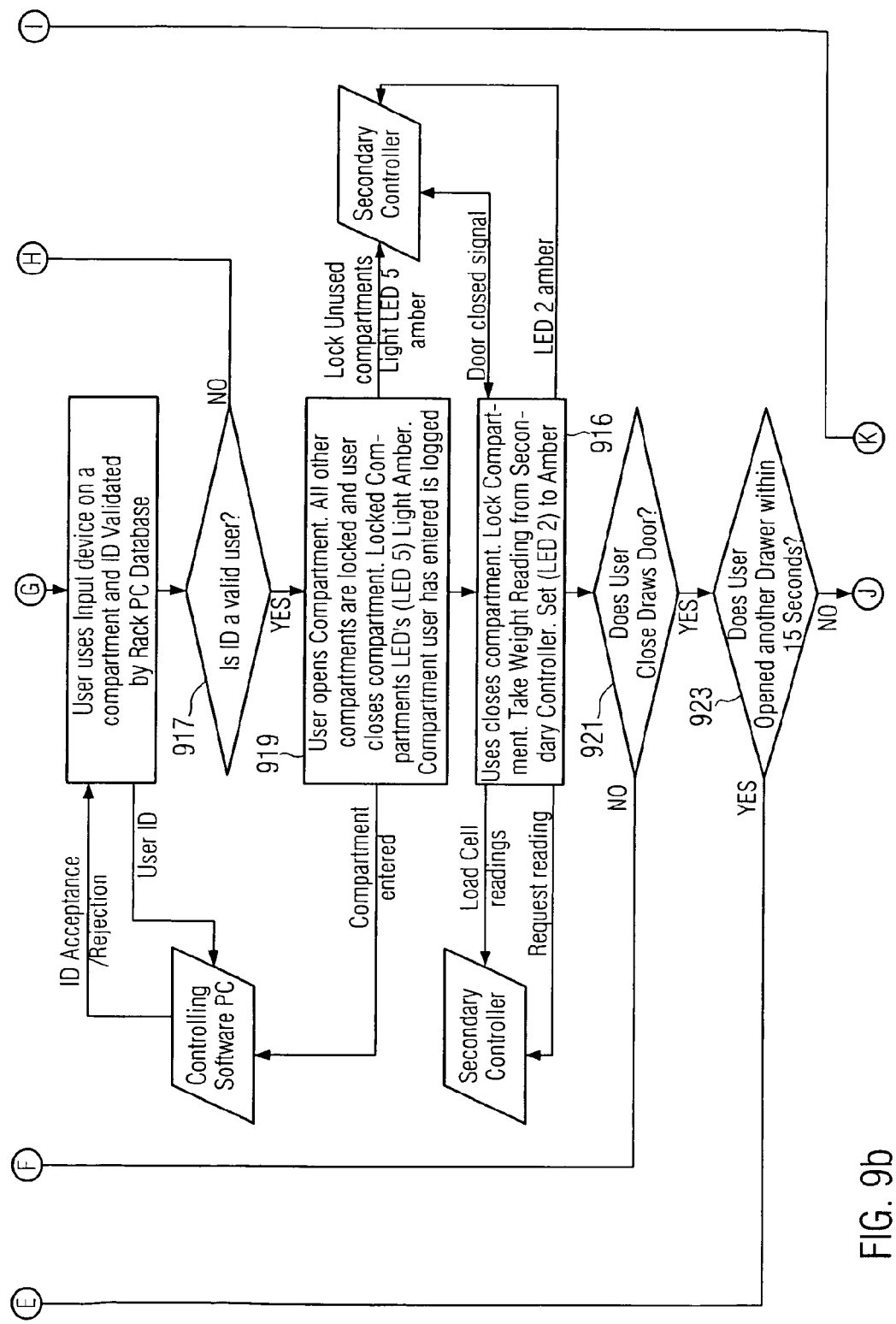
Figure 9C:
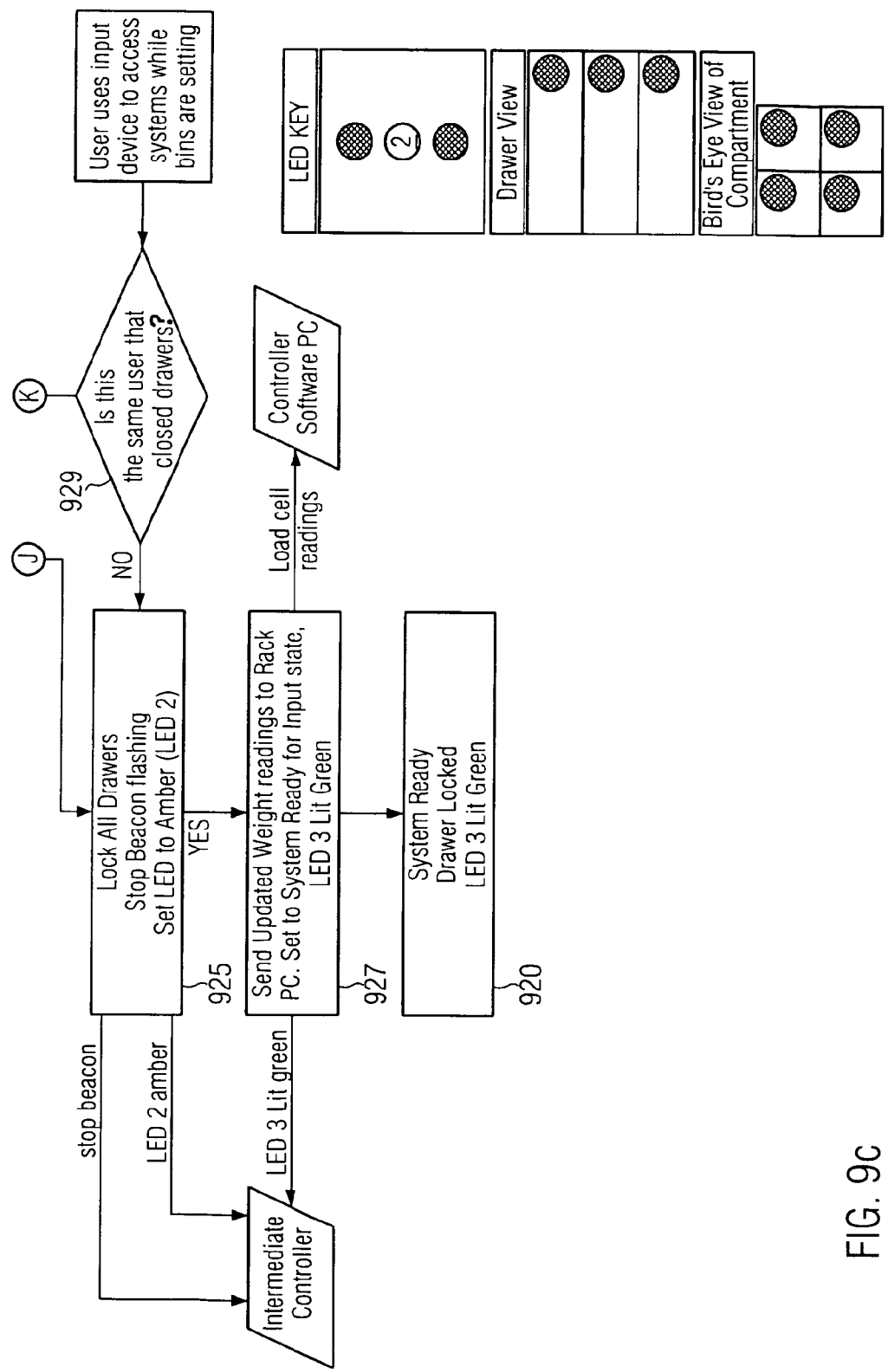

FIG. 9 is a flow chart showing the main processing steps and operations in implementing stock monitoring according to the third embodiment. This is the same as for the second embodiment, except as described hereafter. Instead of lock/unlock, and other actions in relation to doors, the relevant action is taken in relation to drawers (steps 902, 908, 910, 912, 921, 923, 925, 920, 929) or compartments (lids) (steps 914, 919, 916).

In this third embodiment, the weight sensor based solution may utilise a standard tool cabinet e.g. Lista, Bott etc., with drawers that are compartmentalised to provide a high density storage solution with fast access. Each drawer has user access control, and there is also user defined access control at the compartment level. Segmentation of a drawers with the cabinet and use of (i) a weight sensor under the whole segmented drawer or (ii) a number of weight sensors to cover areas (more than one compartment) of the drawer, to control multiple dispensing of the same item from various compartments, may be employed. The compartments have restricted access via transparent openable/lockable lids on each, and the CS PC (Rack PC) records who has accessed the drawer and the individual compartment opened, using a smart button (Dallas key technology) or graphic user interface on the connected CS PC. The software can determine the part being accessed from its location and knows the part and the associated piece part weight of the item being taken, e.g. 9 grams. After the compartment lid has been closed, the CS PC records movement in inventory, e.g. if it is a 27 gram decrement in weight it will calculate that three of that particular part from that compartment have been taken. The user then moves on to obtain inventory from another compartment in the same drawer, or to another drawer, or simply shuts the drawer to close the transaction. This embodiment is ideal for the management of tools and smaller MRO components, where a range of products is required to be stored in a high density solution.

In the foregoing embodiment, one weight sensor may be used to manage multiple compartments, with the parts or stock items in each of those multiple compartments being identical or non-identical. Access control provides the software with the part and associated weight, which allows the weight sensor to record total weight change across all compartments it controls. The software knows the compartment accessed and part that has been taken, as the access control prevents other compartments from being opened until the compartment that has been opened is closed and the new weight sensor reading has been taken.

In a further embodiment, the storage cabinet is in the form of a locker-style cabinet (not dissimilar to those found in sports centres, clubs and schools). This is similar to the first embodiment, but has individual doors to shelves and/or bins, one door per bin or per shelf. This embodiment allows auditable issuance and return control on lockers, rather than having to physically key in the quantity taken or returned, as this relies on trust and user accuracy. Access to individual doors is via a Dallas (Smart) key, a smart key reader being coupled to the CS PC (rack PC). Supervisors have a master key that will allow access to all doors and will allow them to set up access to individual doors locally (on site) for their operatives.

Some functionalities of the stock control system will be summarised. The system utilises weight sensor technology to measure inventory (quantities of stock). Doors with enforced access control allow for user identification. The user swipes his identity card (with or without a PIN number) and this is validated against a user database. The locks on the storage cabinet are then ready to be released. In the first embodiment, the doors are then pushed to release the locks. If the doors are not pushed to open (first embodiment) or not pulled to open (second embodiment), the locks relock after a predetermined period. This prevents anyone else entering the cabinet on the identity card of the original person.

Measurements from the weight sensors are ignored with the exception of anti-tampering reports whilst the cabinet doors are open. The anti-tampering reports provide data on stock movement while the doors are open, e.g. if an individual takes an expensive item and replaces it with a lower value item of the same weight the main reporting system would not identify a stock movement against that individual user. However, the stock control system according to the invention reads the bins rapidly, so even the weight of a hand going in to take the item would be registered.

Users can take inventory and put it back but measurements taken from the load cells are not utilised within the software until the doors have been closed. The measurements from the load cells are then taken for a short predetermined time (e.g. one minute), and subsequent readings are ignored until the doors are opened and closed again. This means that drift in the weight sensors is minimised, as the time to read the weight sensors is finite. The quantity values are incremented or decremented from an original absolute value, which is measured when the cabinet is first loaded with inventory. Therefore the software only looks for changes in the weight of the bins over a very short time period and thus minimises the effect of drift, thereby maintaining high levels of accuracy on the inventory. The system also has the facility to do new absolute readings, which calculates the real time total weight of a bin. There is therefore the opportunity to compare or override the decremented readings from an original absolute value with new absolute readings.

When the doors have been closed the system reads the weight sensors for 15 seconds and does not allow any new users access to the storage cabinet in this period, although the same user can access in this period. This ensures accurate quantity changes and issuance and return quantities against users, as the system averages out peaks and troughs over this 15 second period to ensure accurate readings are taken. If another user does not swipe, readings will be taken for a one minute period to ensure the most accurate readings are taken. After one minute readings are ignored until the doors are opened again.

To restock the cabinet a supplier has a restock card. Physically this is the same as the issuance card (see below) but it identifies the user as a supplier or re-stocker and treats the data differently to materials being placed into cabinet with the issuance card. More particularly:

1) The issuance card is suitably an end user card and monitors material taken from the cabinet against individual employees. When an employee returns stock it is simply deducted from their account. For example, if an employee swipes and takes three pairs of gloves and an hour later returns two pairs, the net usage against their issuance account would be one pair of gloves.
2) The restock card (normally a supplier or third party outsourced replenishment service) treats items being put into the cabinet as new stock being introduced and automatically stores the quantity increases measured after the doors have been shut in a restock file. This means that an automated proof of delivery is recorded in computer memory. The cabinet records the quantities of items put into the cabinet together with the ID of the person that did the restock and the date and time of the transaction. This means performance measures can be automatically generated from the automated data capture The system collects date and time stamped quantity change data and allocates it to a defined user (restocker or employee requiring issuance or return). The system then can send this data through, for example, an ADSL line or via GPRS. Messages of quantity changes are only sent one minute after the doors have been closed. This keeps message traffic to a minimum and therefore the cost of message traffic low. However, it means that quantity data is dynamically updated and available to remote users.

As used herein, "storage cabinet" refers to any housing or container in which bins, compartments, weight sensors, parts, tools or stock items are housed, including for example cabinets with doors and shelves or bins, chests of drawers, and locker style cabinets.

Additional particular embodiments are set out below.

1. In a further embodiment, the system further includes a UI in the form of a touch screen, allowing a delivery (quantity of items for restocking a storage cabinet) to be allocated to a delivery note number. On restocking the supplier swipes their card through the card reader provided on the storage cabinet (and coupled directly or indirectly to the CS PC); the user is then validated and then prompted to enter a delivery note number, for use in database actions. The delivery note number can be keyed in via the touch screen or entered by barcode scanning. This allows access into the storage cabinet, and all quantities put into the storage cabinet will be allocated in the database to the delivery note number, as well as to the user. This allows delivery to a number of storage cabinets connected to the CS PC, and allows an administrator to validate the delivery against this supplier's delivery note number. In addition, this embodiment enables reports to be made available on order fulfillment, supplier performance and number of "stock outs" per supplier, and the duration of stock outs by supplier.

2. In a further embodiment, in which the system further includes a touch screen, the user has the ability to display reports of quantities of items in other storage cabinets at the current storage cabinet touch screen, and if the item they are looking for is not available they have the ability to search from that storage cabinet which user had the last item. The user can also access videos (e.g. how to use a product), and or advertising, pictures and COSSH information at the touch screen of the storage cabinet.

3. In a further embodiment, in which the system further includes a UI, an Exception Report is accessible, indicating items taken out of Job Number Scope (i.e. items that should not have been taken for the job associated with the job number). A list of parts or items can be allocated to a particular job number/charge code. When a user enters a job number/charge code, an exception report is generated if the user takes a part which is outside the scope for that job number/charge code.

4. In a further embodiment, in which the system further includes a touch screen it may be possible to lock out users from a particular storage cabinet, in order to pre-allocate a product. When a user searches for a part from at a storage cabinet touch screen or kiosk, they have the ability to lock a particular storage cabinet for a time frame so that no other users can take that product. Once the user who has locked the storage cabinet has visited the storage cabinet and swiped their card at the card reader, the storage cabinet opens. If the user doesn't swipe their card at the storage cabinet within a predetermined time frame e.g. a number of seconds, or minutes or hours), then that storage cabinet becomes unlocked again.

5. In a further embodiment, in which the system further includes a barcode reader on, adjacent or near a storage cabinet, and associated therewith and coupled to the CS PC, enhanced restocking is provided. Here, there is validation by bar coding of the product to the bar code on the appropriate bin in the storage cabinet. When the user scans the bar code on the product, the code is sent to the CS PC, and the CS PC responds with commands to controller to it light up the correct bin to place the product(s) into. The user then barcode scans the bin to tell the system which bin it is putting the product into. This bin then records a quantity. The benefit is that it ensures the correct part goes into the correct location.

6. In a further embodiment, the system, in addition to load cell technology, further includes a RFID sensor on, adjacent or near a storage cabinet, and associated therewith and coupled to the CS PC. This system is able to enhance processing, to establish part quantity, when parts, stock items etc. are RFID tagged. When a part is RFID tagged its unit weight is also stored by the system. When a user takes a part from a bin having a weight sensor underneath it, the system checks that the RFID tag has left the storage cabinet, but also that the weight has been decremented by the part weight. Where the tag has left the storage cabinet but the weight has not been changed the part is still classed as been in the storage cabinet and an exception report can be generated/viewed, highlighting this problem. Alternatively, if a user takes a product but first rips off the RFID tag or prevents it from signalling the storage cabinet's RFID sensor as it's taken out, the decrement in weight signals that the product has gone. Thus, the RFID technology verifies the weight sensor technology and vice versa. The RFID tagging can also be used for the batch/lot control management of a particular part, i.e. identifying a specific batch/lot number to the user that takes the product.

In a further embodiment, more than one type of part/commodity can be stored on a weight sensor (load cell). The RFID tag identifies which part has been taken and the system knows the expected weight change of the parts taken. For example, if part A weighs 10 g and Part B weighs 7 g and the user tags 2× part A and 1× part B it knows from the RFID tags that the total weight taken from the bin should be 27 g. If it is not then the system reports that there is a variance.

In a further embodiment, RFID tagging also allows the system to check how long an item has been taken away and used for. For example, a tool such as a drill can be RFID tagged, and when it is taken from the storage cabinet, the system knows the time and also the time it is returned. This not only keeps a check of when an item needs to be re-calibrated but also the amount of time an employee has been using an item. This, for example, helps to ensure employees are not exposed to too much vibration from drill usage.

7. In a further embodiment, the system can generate a negative usage report. Over a time period that is set by the user (for example 3 days) a report can be generated, indicating any users that have negative usage (i.e. user that have put more of a product back than they have taken away over the given period). This report assists in identifying users that are potentially tampering with the system.

For example for the usage date of two users below ($2^{nd}$ and $4^{th}$ rows), there are negative readings that can be reported:

| User | Product | Usage | Time |
|---|---|---|---|
| John Brown | ABC | 2 | 12 Feb. 2007 |
| John Brown | ABC | −3 | 13 Feb. 2007 |
| Fred Jones | EFG | 1 | 14 Feb. 2007 |
| Fred Jones | EFG | −10 | 13 Feb. 2007 |
| Anthony Clarke | ABC | 1 | 12 Feb. 2007 |
| Anthony Clarke | ABC | 2 | 13 Feb. 2007 |

| Report Inputs | | |
|---|---|---|
| Date: To_____ | | from_____ |
| Time Period | _____days | |

| Report Format | | |
|---|---|---|
| User | Product | Aggregated Usage |
| John Brown | ABC | −1 |
| Fred Jones | EFG | −9 |

In a further embodiment, the system can store (in the database accessible by CS PC and associates with user ID) user size information, to restrict access to bins to specific users (who must enter their ID), or light up bins for the sizes of that specific user. This helps ensure users take the correct size products e.g. respirators, gloves, shoes etc., enhancing safety.

What is claimed is:

1. A method carried out in a stock monitoring system, comprising:
   providing a stock monitoring system including:
      a housing,
      one or more doors disposed in or on the housing,
      a sensor for sensing the condition of the door(s) and providing a door closed signal indicative of the door(s) having been closed by a user;
      one or more containers for stock items, located within the housing, the or each container having associated therewith a weight sensor for providing a weight signal indicative of the current weight of the container, and
      control circuitry, coupled for communication with the weight sensor(s);
   receiving a door closed signal;
   receiving one or more weight signals;
   determining, for the at least one of the one or more container, the number of stock items removed from the container(s) by the user, from the weight signal(s) occurring during a predetermined sensing period, the predetermined sensing period being dependent upon the door closed signal, wherein the predetermined sensing period comprises a first predetermined time period after the door closed signal.

2. The method of claim 1, wherein determining the number of stock items removed from the container by the user is determined by a comparison of a first total weight of the container(s) determined at a first time and a second total weight of the container(s) determined at a second time after the first time, without use of RFID information related to the stock items.

3. The method of claim 1, wherein the step of determining comprises:
   determining a current average weight of the container by averaging the weight signals over the predetermined sensing period;
   determining the weight difference for the container, the weight difference being the difference between the current average weight and the previously determined average weight;
   dividing the weight difference by a weight unit stored in memory in association with an identifier for the container, thereby obtaining the number of stock items removed from the container by the user.

4. The method claim 3, wherein the stock monitoring system further comprises a user ID sensor, adapted to be activated by a user and, wherein the method further comprises:
   obtaining a user ID from the user ID sensor upon activation by a user;
   determining if the user ID obtained is valid.

5. The method of claim 4, wherein user ID sensor is a swipe card reader, and the step of obtaining comprises extracting a user ID from a swipe card upon swiping by a user.

6. The method of claim 4, wherein user ID sensor is a Dallas key sensor, and the step of obtaining comprises extracting a user ID from a Dallas key upon activation of the Dallas key sensor by a user using his Dallas key.

7. The method of claim 4, wherein the stock monitoring system further comprises one or more electrically controlled locks associated with the door(s), the lock(s) being electrically controllable such that the door(s) are in either a locked or releasable condition, the control circuitry being coupled for communication with the locks, wherein the method further comprises:
   priming the doors for opening when door open conditions are met, whereby the door(s) are in said releasable condition.

8. The method of claim 7, wherein the door open conditions comprise:
   the obtained user ID is a valid ID,
   the user ID obtained is different from the previously obtained user ID; and
   the predetermined sensing period has elapsed;
   wherein the predetermined sensing period comprises a second predetermined time period after the door closed signal, different from the first predetermined time period.

9. The method of claim 7, further comprising:
   activating the lock(s) so that the door(s) are in a locked condition, when the door(s) have not been opened by the user within a third predetermined time period after the doors have been primed for opening.

10. A stock monitoring system, comprising:
    a housing;
    one or more doors disposed in or on the housing;
    a sensor for sensing the condition of the door(s) and providing a door closed signal indicative of the door(s) having been closed by a user;
    one or more containers for stock items, located within the housing, the one or more containers having associated therewith a weight sensor for providing a weight signal indicative of the current weight of the container; and
    control circuitry coupled for communication with the weight sensor(s), thereby determining, for the at least one of the one or more container(s), a number of stock items removed from the container(s) by the user, from the weight signal(s) occurring during a predetermined sensing period, the predetermined sensing period being dependent upon the door closed signal, and the predetermined sensing period comprising a first predetermined time period after the door closed signal.

11. A stock monitoring system according to claim 10, further comprising:
    a means for activating the stock monitoring by a user.

12. A stock monitoring system, comprising:
    one or more lockable doors,
    a user ID sensor, adapted to be activated by a user, and
    one or more electrically controlled locks associated with the door(s), the lock(s) being electrically controllable such that the door(s) are in either a locked or releasable condition, the control circuitry being coupled for communication with the locks.

13. A stock monitoring system, comprising:
    a housing,
    one or more doors disposed in or on the housing,
    a sensor for sensing the condition of the door(s) and providing a door closed signal indicative of the door(s) having been closed by a user;
    one or more containers for stock items, located within the housing, the or each container having associated therewith a weight sensor for providing a weight signal indicative of the current weight of the container,
    control circuitry, coupled for communication with the weight sensor(s);
    wherein the control circuitry is operable for
    (a) receiving a door closed signal;
    (b) receiving one or more weight signals;
    (c) determining, for the or each container, the number of stock items removed from the container(s) by the user, from the weight signal(s) occurring during a predetermined sensing period, the predetermined sensing period being dependent upon the door closed signal, wherein the predetermined sensing period comprises a first predetermined time period after the door closed signal.

14. The system of claim 13, wherein determining the number of stock items removed from the container by the user is determined by a comparison of a first total weight of the container(s) determined at a first time and a second total weight of the container(s) determined at a second time after the first time, without use of RFID information related to the stock items.

15. The system of claim 13, further comprising a means for determining the number of stock items removed from the container(s) by:
   determining a current average weight of the container by averaging the weight signals over the predetermined sensing period;
   determining the weight difference for the container, the weight difference being the difference between the current average weight and the previously determined average weight;
   dividing the weight difference by a weight unit stored in memory in association with an identifier for the container, thereby obtaining the number of stock items removed from the container by the user.

16. The system of claim 15, further comprises a user ID sensor, adapted to be activated by a user and operable for,
   obtaining a user ID from the user ID sensor upon activation by a user; and
   determining if the user ID obtained is valid.

17. The system of claim 16, wherein user ID sensor is a swipe card reader, and obtaining a user ID comprises extracting a user ID from a swipe card upon swiping by a user.

18. The system of claim 16, wherein user ID sensor is a Dallas key sensor, and obtaining a user ID comprises extracting a user ID from a Dallas key upon activation of the Dallas key sensor by a user using his Dallas key.

19. The system of claim 13, wherein the stock monitoring system further comprises one or more electrically controlled locks associated with the door(s), the lock(s) being electrically controllable such that the door(s) are in either a locked or releasable condition, the control circuitry being coupled for communication with the locks, wherein the wherein the control circuitry is operable for:
   priming the doors for opening if door open conditions are met, whereby the door(s) are in said releasable condition.

20. The system of claim 19, wherein the door open conditions comprise:
   the obtained user ID is a valid ID,
   the user ID obtained is different from the previously obtained user ID; and
   the predetermined sensing period has elapsed;
wherein the predetermined sensing period comprises a second predetermined time period after the door closed signal, different from the first predetermined time period.

* * * * *